Figure 1:
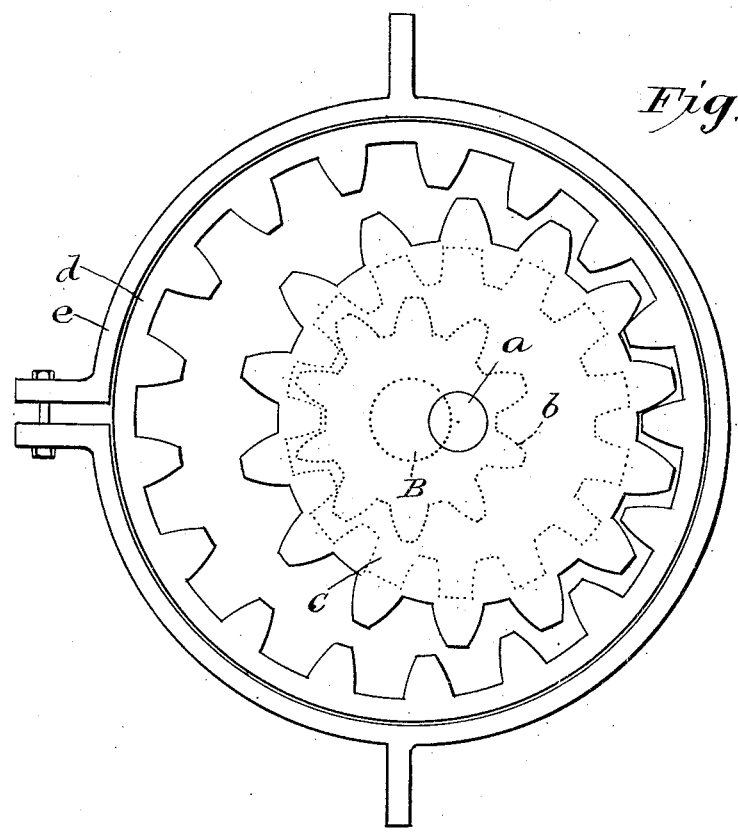
Figure 2:
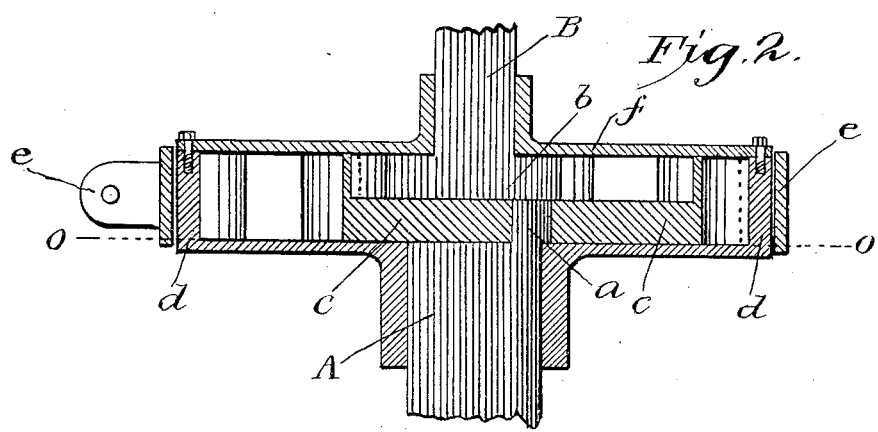

W. BELSHAW.
PLANETARY ECCENTRIC SYSTEM OF GEARING.
APPLICATION FILED AUG. 12, 1915.

1,347,671. Patented July 27, 1920.

WITNESSES:
Frank Shaffer
Geo. A. Smith

Walter Belshaw
INVENTOR.

UNITED STATES PATENT OFFICE.

WALTER BELSHAW, OF EVERETT, WASHINGTON, ASSIGNOR, BY DIRECT AND MESNE ASSIGNMENTS, OF FOUR-FIFTHS TO BELSHAW ENGINE CO., OF EVERETT, WASHINGTON, A CORPORATION OF WASHINGTON.

PLANETARY ECCENTRIC SYSTEM OF GEARING.

1,347,671.  Specification of Letters Patent.  Patented July 27, 1920.

Application filed August 12, 1915. Serial No. 45,223.

*To all whom it may concern:*

Be it known that I, WALTER BELSHAW, a citizen of the United States, residing at Everett, in the county of Snohomish and the State of Washington, have invented new and useful Improvements in Planetary Eccentric Systems of Gearing, of which the following is a description sufficiently full and clear and exact to enable those skilled in the art to which it appertains to make and use the same.

My invention relates to a planetary eccentric system of gearing interposed between driving and driven elements; and the object of my invention is to improve gearing of this type with the least number of working parts, simple in construction, inexpensive to manufacture and provide a means to reverse the direction of rotation of shafting while transmitting power.

I attain these objects by the mechanism illustrated in the accompanying drawings, in which—

Figure one (1) is an end plan view drawn from a plane O, O, in Fig. two (2).

Fig. two (2) is a sectional view drawn through the center of the gear.

Similar letters refer to similar parts throughout the several views.

When it is desirable for a reverse action to take place between the driving and driven elements, the drum "$d$", is held against rotation by the band "$e$", or any suitable means, then the eccentric "$a$", being fast to or made a part of the drive shaft "A", and being journaled in the center of the externally and internally toothed gear "$c$", acts as an axis for the gear "$c$" and on being revolved, causes the gear "$c$" to traverse the entire inner circumference of drum "$d$" and on account of a less number of teeth being on gear "$c$" than there are in drum "$d$" it will take more than one revolution of gear "$c$" to traverse the inside of drum "$d$", this will cause the gear "$c$" to rotate on its own axis in the opposite direction than which it is revolved by eccentric "$a$". The pinion "$b$" is journaled on its cylindrical portion "B" in flange "$f$" while its teeth at all times engage with the inner teeth of gear "$c$", causing the driven element B to rotate in the opposite direction to the driving element A.

It will be noted that the driving and driven elements are contained substantially within the gear C.

Having now fully described my invention, what I claim is:—

1. The combination of a member having an eccentric pin, a drum having internal teeth, a gear journaled on the eccentric pin and provided with external teeth meshing with the internal teeth of the drum and with internal teeth of less length than the external teeth, a pinion having teeth of the same length as the internal teeth of the gear and meshing therewith, a second member carrying the pinion, and means for braking the drum.

2. The combination of driving and driven elements, a drum journaled thereon including side walls and an internal gear, an eccentric bearing member on one element, a gear journaled on the eccentric bearing member and being of a width to closely fit the side walls, said gear having external teeth meshing with the internal gear of said drum and internal teeth of less length than the external teeth, a pinion carried by the other element and having teeth of the same length as and meshing with said internal teeth of the gear, and means for braking the drum.

3. The combination of driving and driven elements, a drum having sides journaled on said elements and an internal gear, an eccentric bearing member carried by one of said elements and overlapping and bearing against one of the drum sides, a gear journaled on said eccentric bearing member and being of substantially the same width as the distance between the drum sides so as to bear thereagainst in operation, said gear having external teeth meshing with said internal teeth of the drum and internal teeth of less length than the external teeth, a pinion carried by the other of said elements and having teeth of the same length as and meshing with the internal teeth of said gear, and means for braking the drum.

4. The combination of driving and driven elements, a drum having sides and an internal gear, an eccentric bearing member carried by one of said elements, a gear journaled on said eccentric bearing member and bearing laterally against the drum sides, said gear having external teeth meshing with the internal gear of the drum and internal teeth, a pinion carried by the other element and bearing laterally against the body portion of said gear and one of the drum sides, said pinion having teeth meshing with the internal teeth of said gear, and means for holding the drum against rotation.

WALTER BELSHAW.

Witnesses:
 FRANK SHAFFER,
 THEODORE ANDERSON.